Aug. 23, 1966 C. D. IRWIN ET AL 3,267,773
POWDERED BALLAST UNLOADING DEVICE
Filed Nov. 27, 1964 2 Sheets-Sheet 1
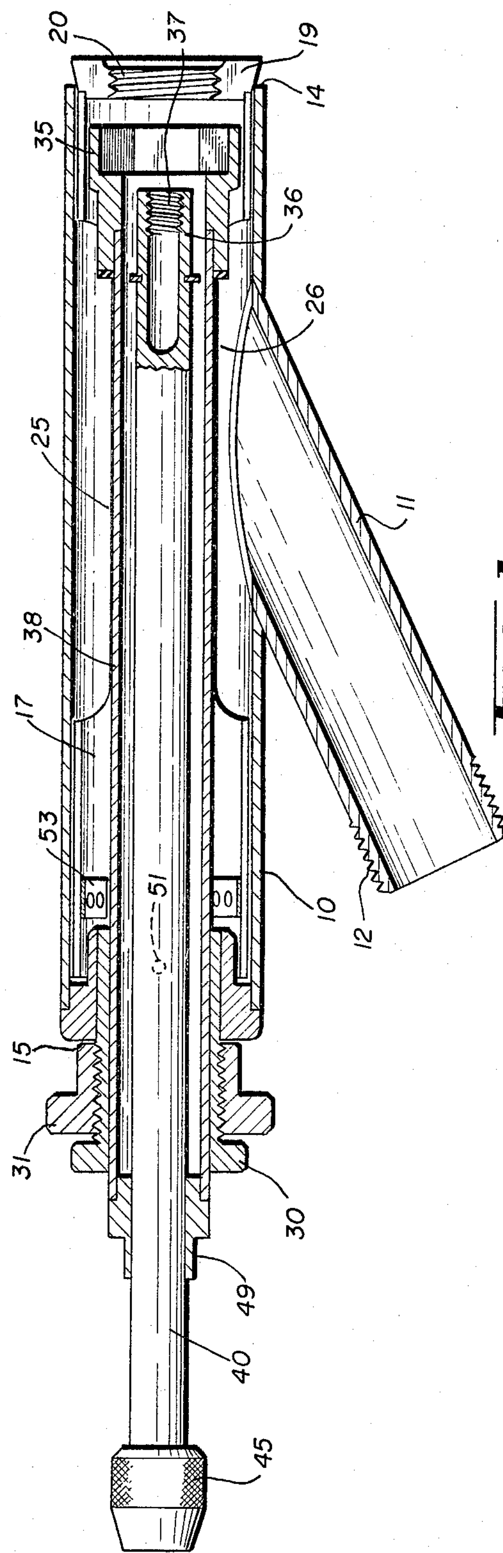
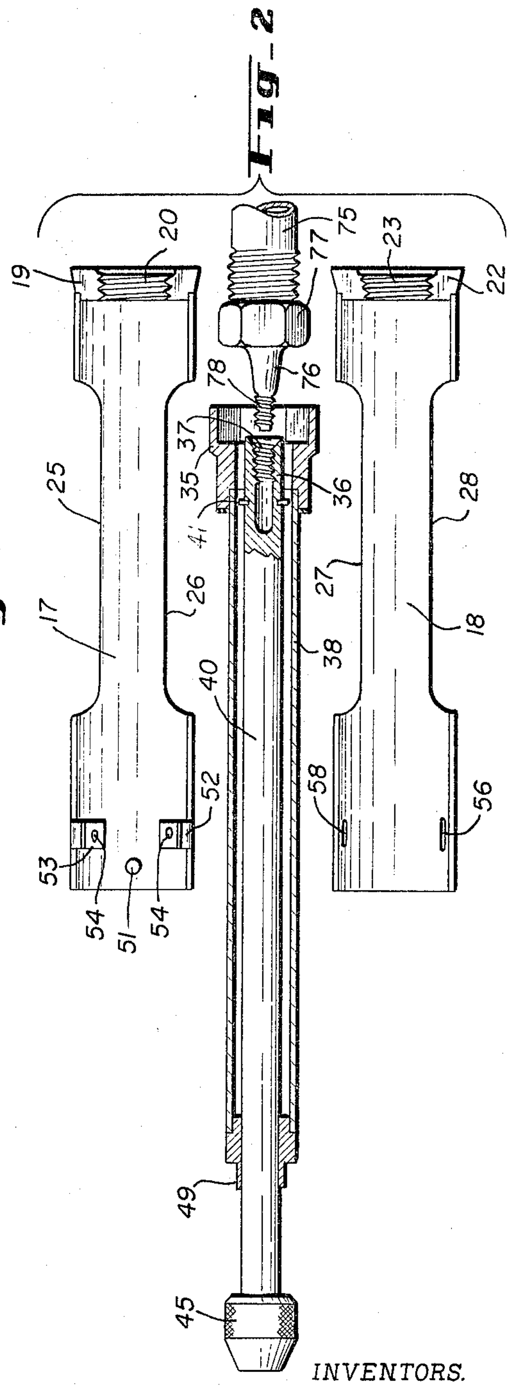
INVENTORS.
Charles Irwin
George E. Schultz
BY
McGrew & Edwards
ATTORNEYS POWDERED BALLAST UNLOADING DEVICE
Filed Nov. 27, 1964 2 Sheets-Sheet 2
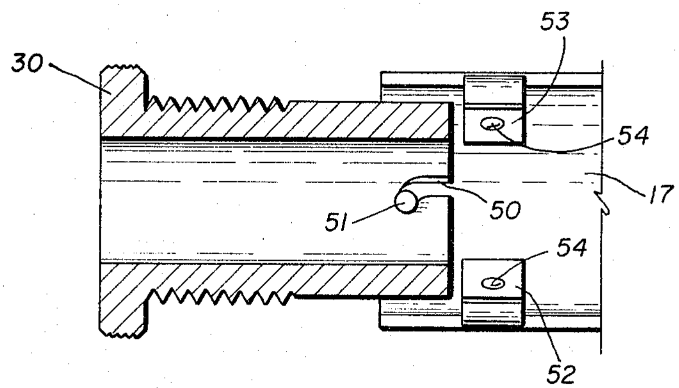
Fig_3
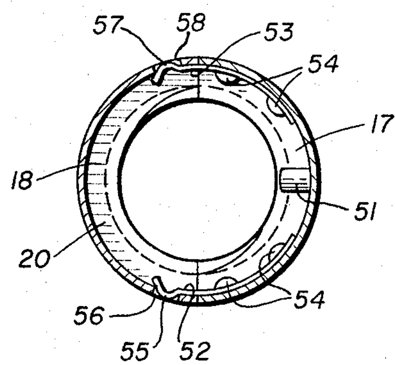
Fig_4
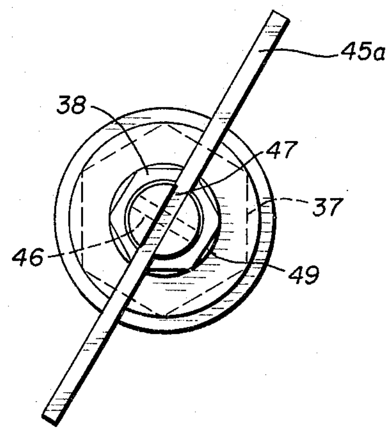
Fig_5
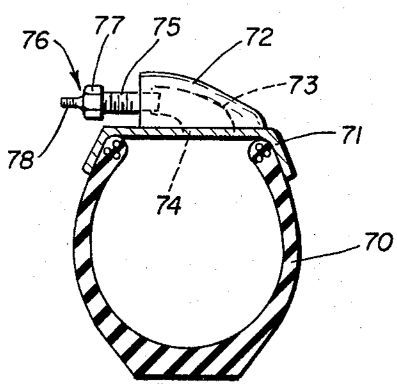
Fig_6
INVENTORS.
Charles Irwin
George E. Schultz
BY
McGrew & Edwards
ATTORNEYS United States Patent Office 3,267,773
Patented August 23, 1966

3,267,773
POWDERED BALLAST UNLOADING DEVICE

Charles D. Irwin and George E. Schultz, Boulder, Colo., assignors to Led Ballast, Inc., Boulder, Colo., a corporation of Colorado Filed Nov. 27, 1964, Ser. No. 414,263
8 Claims. (Cl. 81—3)

This invention relates to unloading devices for removing powdered ballast from pneumatic vehicle tires.

In recent years powdered ballast developed for weighting pneumatic tires for vehicles has achieved considerable commercial success. One product includes the use of a finely powdered dry ballast which fills a major portion of the tire, but with sufficient space left for pressurizing the tire with air so that on rotation the powder becomes fluidized and the tire retains its pneumatic characteristics.

The powdered ballast performs satisfactorily in most instances. While the need to withdraw the powder is not a too frequent occurrence, certain difficulties have been encountered in attempting to withdraw the powder from a tire which is still pressurized. With the tire pressurized, the removal of the valve stem from the tire filler stem blows the ballast out of the tire into the atmosphere. Therefore, it is common practice to bleed the air from the tire very slowly so that the ballast in the tire is not blown out during the bleeding.

Included among the objects and advantages of the present invention is a device for removing the valve stem or the cap on the filler tube of a tire filled with ballast and air pressurized.

Another object of the invention is to remove the cap or valve stem of a tire filled with ballast and pressurized whereby the tire is quickly and easily depressurized and the ballast recovered. The invention provides means for completely enclosing the tire stem prior to removal of its cap and includes means for attaching an outlet conduit for transporting powder to a container. The device of the invention is quickly and easily attached to a tire stem, the cap is quickly and easily removed, and the whole device is then quickly removable from the tire so as to decrease the time necessary for unloading ballast from the tire.

These and other objects and advantages of the invention may be readily ascertained by referring to the following description and appended illustrations in which:

FIG. 1 is a cross-sectional view of the device of the invention;

FIG. 2 is an exploded view of a portion of the apparatus showing the positioning of members on a tire valve stem;

FIG. 3 is an enlarged detail of one means of securing parts of the device together;

FIG. 4 is a cross-sectional view of the inner clamp members showing their positioning and holding by means of spring clips;

FIG. 5 is a top plan view of the wrench portions of the device showing a modified operating handle for the removal of a valve stem cap; and FIG. 6 is a partial cross-sectional view, in exaggerated detail, of a tire and valve stem on which the device of the invention is used.

In general, the device of the invention provides a sheath which is arranged to fit over and be sealed on the valve stem of a tire on which it is to be used, the sheath being provided with an outlet for air and powder. Means are provided for clamping onto the valve stem itself for sealing that end of the sheath, and at the opposite end control means are provided for controlling the clamping means on the valve stem. A wrench extends through the sheath and extends beyond said control end for removing the cap for the valve stem.

In the embodiment selected for illustration, a tubular member 10 is provided with a side outlet member 11 threaded at 12 for attachment to a conduit to a storage container, neither of which is shown. The tubular member 10 has full open end 14 and an opposite partially open end having fitting 15. A split tubular member or sleeve is arranged to telescope internally of the sleeve 10, and the split sleeve includes half 17 and opposing half 18, shown in FIG. 2. Each side of the split member includes one half of a threaded fitting, the two combining to form a short internally threaded collar. The side 17 has a threaded fitting 20 secured thereto and the side 18 has a threaded fitting 23. The outside of each half of the collar is flared; the threaded half fitting 20 including a flared end 19 arranged to seat and seal against the half of the end 14 of the tube 10. In a similar manner, the half 18 is provided with its threaded fitting 23 having a flared end 22. The threads in the fittings 20 and 23 are arranged to mate and clamp on the threads on the stem of the tire to form a tight fit, and when the tube 10 is pulled down against the flared sides of the threaded fittings, the threaded fittings are held tightly together and form a seal over the threads of the neck of the tire filler stem.

Each tubular half of the insert includes a cut-out portion on opposite sides, i.e., the half 17 includes cutouts 25 and 26 and the half 18 includes cutouts 27 and 28. The cutouts provide opening means for the joining tube halves 17 and 18 for release of powder when the cap of the tire filler tube has been removed. The cutouts are arranged to exhaust in the vicinity of the outlet 11.

The clamping and locking means for the split tube in the tubular member 10 includes a short tubular insert 30 which is arranged to be fastened to at least one of said halves of the tubular insert in the member 10. One suitable fastening or attachment is a bayonet joint which will be described below. The tubular insert 30 is secured to one of the halves, and a lock ring 31 which is threadedly mounted on the insert 30 is arranged to bear against the end 15 pulling the tubular insert toward that end and forcing the conical surfaces of the flared ends against the end 14 of the tubular member. This forces the two fittings together sealing the same on the threads of the filler tube.

The removing tools for the cap on the valve stem include a hollow long shank, socket wrench 35 and a long shank, threaded valve stem wrench 36, which is telescoped in the socket wrench, for attachment to the valve stem portion by means of threads 37. The hollow shank 38 of the socket wrench 35 is reciprocally mounted with a close fit in the sleeve 30. In a like manner, the solid shank 40 of the valve stem wrench 36 is reciprocally mounted in the hollow tubular shank 38 of the socket wrench and an end fitting 49 provides a seal means for the two members. The valve stem wrench is provided with a knurled handle 45. Other seal means may be provided between the movable parts to prevent air and ballast blowing out of the tube 10.

The handle 45 provides means for turning the wrench to screw it onto the valve stem of a tire for positively holding a cap 76, FIG. 2, normally closing a tire filler tube 75. The fitting 49 of the socket wrench 35 is provided with a wrench hold on which may be placed a wrench turning the socket for removing the cap of a tire. The stem wrench securely holds the cap and permits the cap to be withdrawn from the vicinity of the filler tube after removal. A snap ring 41 prevents removal of the stem wrench from the socket wrench. In place of the knurled handle 45, a pivoting handle 45*a* mounted on a pivot pin 46 may be used. By slotting the shank, not shown, the handle may be turned into alignment with the shank.

The sleeve 30 is provided at its inner end with an L-shaped slot 50, FIG. 3, into which a pin 51, mounted on tube half 17, is attached so as to provide a secure bayonet-type connection between the two members. The outer ends of the two halves of the split tube are temporarily secured together by means of spring clamps during assembly of the device over a tire filler tube. As shown in FIG. 4, spring clamps 52 and 53 are secured by rivets 54 on opposed edges of the half 17. Spring 52 includes an extending bend 55 which is arranged to seat in an opening 56 in the half 18 and spring 53 includes bend 57 seating in opening 58 in the half 18. This permits the two halves to be placed together over a stem and held in position until the tube 10 is telescoped over them during the attachment of the device to a valve stem.

In use, the device is adapted for a tire having an enlarged filler tube or stem; for example, as shown in FIG. 6, a tire 70 mounted on a rim 71 is provided with an inlet 74 so that the tire may be filled with air and ballast. The inlet to the tire includes a fitting 72 which is secured to the rim by welding, bolts or the like, hermetically sealing the parts together. A passage 73 communicates through the fitting with a hole 74 in the rim to the interior of the tire. A nipple or filler tube 75 is secured in the fitting 72 and a valve stem fitting 76 is threadedly engaged on the nipple 75. The valve stem fitting or cap 76 includes a hexagonal nut portion 77 fitting the socket wrench 35. The cap reduces down to a valve stem portion 78 which includes an exterior threaded portion and an interior threaded portion (not shown) in which a valve core is placed.

When it is desired to depressurize a tire containing ballast, the two inner sleeve halves 17 and 18 are placed over the cap of the valve stem with the threads of the split fitting thereof engaging the threads of the nipple 75. When in engagement, the spring latches are snapped shut so that the split tube is held in position. The wrenches are telescoped into place in the split tube. The tubular member 10 is slid over the split tube, and the inserts 30 and 31 are moved in place over the wrenches. Insert 30 is secured by its bayonet joint to the split tube half 17. The outer lock nut 31 is then pulled down tight against end 15, forcing the flared fitting halves against end 14 to secure the inner split tube on the nipple and to seal both ends of the sheath 10. The small inner wrench 36 is then screwed onto the valve stem 78 and the socket wrench 35 is placed over the large hex-nut portion 77 of the cap. With the outlet 11 attached to a conduit to a ballast separating tank, the cap is then removed by turning the socket wrench 35 counterclockwise, using an external wrench secured to the wrench portion 49 thereof. After removal of the cap 76, it may be pulled away from the nipple by merely pulling on the valve stem wrench and/or the socket wrench, leaving a full opening for the ballast and air from nipple through the side openings in the split sleeve and subsequently to the outlet 11.

While the invention has been described with reference to a particular embodiment, there is no intent to limit the spirit or scope of the invention to the same, realizing that changes or modifications may be performed within the scope and the spirit of the invention.

I claim:

1. A device for releasing powdered ballast and air under pressure from a pneumatic tire comprising cover means arranged to telescope over a tire filler stem and its cap; clamp means arranged to telescope in said cover means; sealing means on one end of said clamp means for sealing on the neck of a tire filler stem; means on said one end of said clamp means cooperative with said cover means for clamping said sealing means on a tire filler stem; means for temporarily securing said clamp means in said cover means; a socket wrench reciprocally telescoped in said clamp means arranged for engaging and manipulating the cap on a tire filler stem; means for holding the cap of a filler stem in relation to said socket wrench; and outlet means for powder and air from said clamp means and said cover means.

2. A device for releasing powdered ballast and air under pressure from a pneumatic tire comprising sheath means arranged to telescope over a tire filler stem and its cap; a split tube arranged to telescope in said sheath; sealing means on one end of said split tube for sealing on the neck of a tire filler stem; means on said one end of said split tube cooperative with said sheath for clamping said sealing means on a filler stem; means for temporarily securing said split tube in said sheath and thereby secure said sealing means on a tire filler stem; a socket wrench reciprocally telescoped in said split tube for engaging and manipulating the cap on a tire filler stem; means for holding the cap of a filler stem in relation to said socket wrench; and outlet means for powder and air from said split tube and said sheath.

3. A device for releasing powdered ballast and air under pressure from a pneumatic tire comprising sheath means arranged to telescope over a tire filler stem and its cap; a split tube arranged to telescope in said sheath, said split tube having openings in its wall for lateral release of powder and air; sealing means on one end of said split tube for sealing on the neck of a tire filler stem; means on said one end of said split tube cooperative with said sheath for clamping said sealing means on a filler stem; means inclusive of a collar securable to said split tube and a lock nut for temporarily securing said split tube in said sheath and thereby securing said sealing means on a tire filler stem; a socket wrench reciprocally telescoped in said split tube for engaging and manipulating the cap on a filler stem; means for holding the cap of a tire filler stem in relation to said socket wrench; and outlet means for said sheath means for powder and air released from said split tube.

4. A device according to claim 3 in which said sealing means includes a split fitting having internal threads to mate with threads on a tire filler stem.

5. A device according to claim 3 in which said means on one end of said split tube is an outwardly flared surface on said sealing means cooperative with the end of said sheath means for clamping said sealing means on the tire filler stem when said flared surface is moved axially inward into said sheath means.

6. A device for releasing powdered ballast and air under pressure from a pneumatic tire comprising a tubular member arranged to telescope over a tire filler stem and its cap; a split tube arranged to telescope in said member and provided with cutouts to form openings through said split tube when the two halves are placed together; means on one end of each half of said split tube arranged to cooperatively form a seal on the neck of a tire filler stem; means arranged with said sealing means for cooperatively moving against said tubular member for clamping the sealing means on a tire filler stem; means for temporarily securing said split tube in said member and thereby securing said sealing means into sealing relation with a tire filler stem; a socket wrench reciprocally telescoped in said split tube for engaging and manipulating the cap on a filler stem; means for holding the cap of a filler stem in relation to said socket wrench; and outlet means for powder and air from said tubular member.

7. A device for releasing powdered ballast and air under pressure from a pneumatic tire comprising a tubular member arranged to telescope over a tire filler stem and its cap; a split tube arranged to telescope in said member and provided with cutouts to form openings through said split tube when the two halves are placed together; means on one end of each half of said split tube arranged to cooperatively form a seal on the neck of a filler stem; means arranged with said sealing means for cooperatively moving against said tubular member for clamping the sealing means on a tire filler stem; means for temporarily securing said split tube in said member and thereby securing said sealing means into sealing relation with a filler stem; a long shank socket wrench reciprocally telescoped in said split tube for engaging and manipulating the cap on a filler stem, said shank extending beyond said tubular member and including a wrench hold; means for holding the cap of a filler stem in relation to said socket wrench; and outlet means for powder and air from said tubular member.

8. A device according to claim 7 in which said means for holding the cap of a filler stem is a long shank wrench reciprocally disposed in said long shank socket wrench and extending therebeyond for external manipulation thereof.

References Cited by the Examiner

UNITED STATES PATENTS 3,200,858 8/1965 Kampert ------------ 141—38

WILLIAM FELDMAN, *Primary Examiner.*

O. M. SIMPSON, *Assistant Examiner.*